US011922908B2

(12) United States Patent
Ogden, III

(10) Patent No.: US 11,922,908 B2
(45) Date of Patent: Mar. 5, 2024

(54) REMOVABLE STRING INSTRUMENT THUMB REST

(71) Applicant: John A. Ogden, III, Atlanta, GA (US)

(72) Inventor: John A. Ogden, III, Atlanta, GA (US)

( * ) Notice: Subject to any disclaimer, the term of this patent is extended or adjusted under 35 U.S.C. 154(b) by 0 days.

(21) Appl. No.: 17/834,690

(22) Filed: Jun. 7, 2022

(65) Prior Publication Data

US 2022/0398998 A1 Dec. 15, 2022

Related U.S. Application Data

(60) Provisional application No. 63/208,958, filed on Jun. 9, 2021.

(51) Int. Cl.
*G10D 3/18* (2020.01)

(52) U.S. Cl.
CPC .................................. *G10D 3/18* (2013.01)

(58) Field of Classification Search
CPC .................................................. G10D 3/18
See application file for complete search history.

(56) References Cited

U.S. PATENT DOCUMENTS

| | | | | |
|---|---|---|---|---|
| 389,085 A * | 9/1888 | John | G10D 3/18 | 84/328 |
| 4,739,689 A * | 4/1988 | Cacioppo | G10D 3/18 | 84/453 |
| 9,576,562 B1 * | 2/2017 | Porter | G10D 3/18 | |
| 9,928,812 B2 * | 3/2018 | Porter | G10D 1/08 | |
| 2004/0083874 A1 * | 5/2004 | Cacioppo | G10D 3/18 | 84/328 |
| 2014/0326124 A1 * | 11/2014 | Osenkov | G10D 1/08 | 84/293 |
| 2022/0398998 A1 * | 12/2022 | Ogden, III | G10D 1/08 | |

FOREIGN PATENT DOCUMENTS

| | | | | |
|---|---|---|---|---|
| FR | 2789794 A1 * | 8/2000 | G10D 3/18 |
| JP | 2022126565 A * | 8/2022 | |

* cited by examiner

*Primary Examiner* — Robert W Horn

(57) ABSTRACT

The present invention is a thumb rest that has a wedge body that attaches to a string instrument such as a bass or guitar. The wedge body has fastening holes, extruded ridges, contoured edges, and a string instrument facing side. This allows for a less permanent modification to the instrument. The fastening holes are circular holes that traverse into the wedge body. The extruded ridges are rectangular sections extending from the wedge body. The string instrument facing side is the flat side of the wedge body. The proposed implementation allows a user to remove and or move the thumb rest at any time.

16 Claims, 5 Drawing Sheets

REMOVABLE STRING INSTRUMENT THUMB REST

FIELD OF THE INVENTION

The present invention relates generally to musical instruments and accessories. More specifically, a removable string instrument thumb rest that can be attached to a bass guitar and other instruments and implementations.

BACKGROUND OF THE INVENTION

Bass thumb rests have existed since the at least the 1970's and are integral to some players technique. Because of the need for some type of permanent or semi-permanent modification, many players have never tried one because of potential damage to the instrument. Thumb rest have also not evolved much since their inception and have typically been rectangular bars with little to no ergonomics. The wedge like shape of a thumb rest is more conducive to the necessary angle of the thumb and picking fingers as they go through their stroke motion. Hands of musicians are not the same and the shape of the proposed thumb rest allows for a dynamic range of thumb positioning compared to the traditional bar shaped rests. The ability to move and change the angle of the thumb rest allows for complete customizing of positioning for the user. Because the product does not need hardware and is not dependent on the shape of the instrument, it can be used universally on any bass, guitar, or other string instrument.

DETAIL DESCRIPTIONS OF THE INVENTION

All illustrations of the drawings are for the purpose of describing selected versions of the present invention and are not intended to limit the scope of the present invention.

Figure 4:
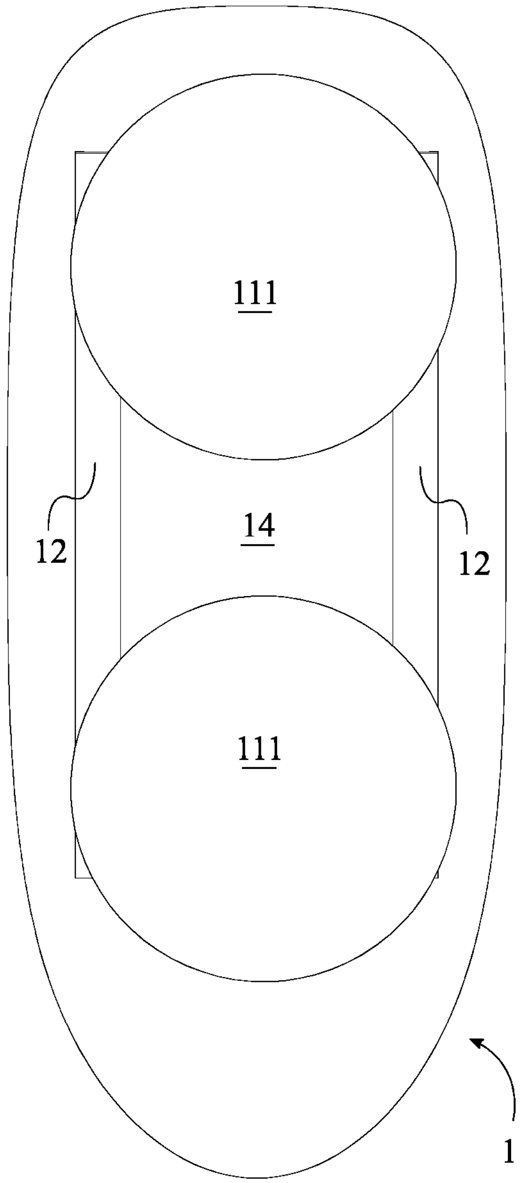
FIG. 4 is a bottom view of the present invention.

The present invention is a removable string instrument thumb rest that comprises a wedge body 1 in its preferred embodiment. The wedge body 1 comprises a plurality of fastening holes 11, a plurality of extruded ridges 12, a plurality of contoured edges 13, and a string instrument facing side 14. The plurality of fastening holes 11 is circular holes that traverse into the wedge body 1. The plurality of extruded ridges 12 is rectangular sections extending from the wedge body 1. The string instrument facing side 14 is the flat side of the wedge body 1 as shown in FIG. 4.

Figure 1:
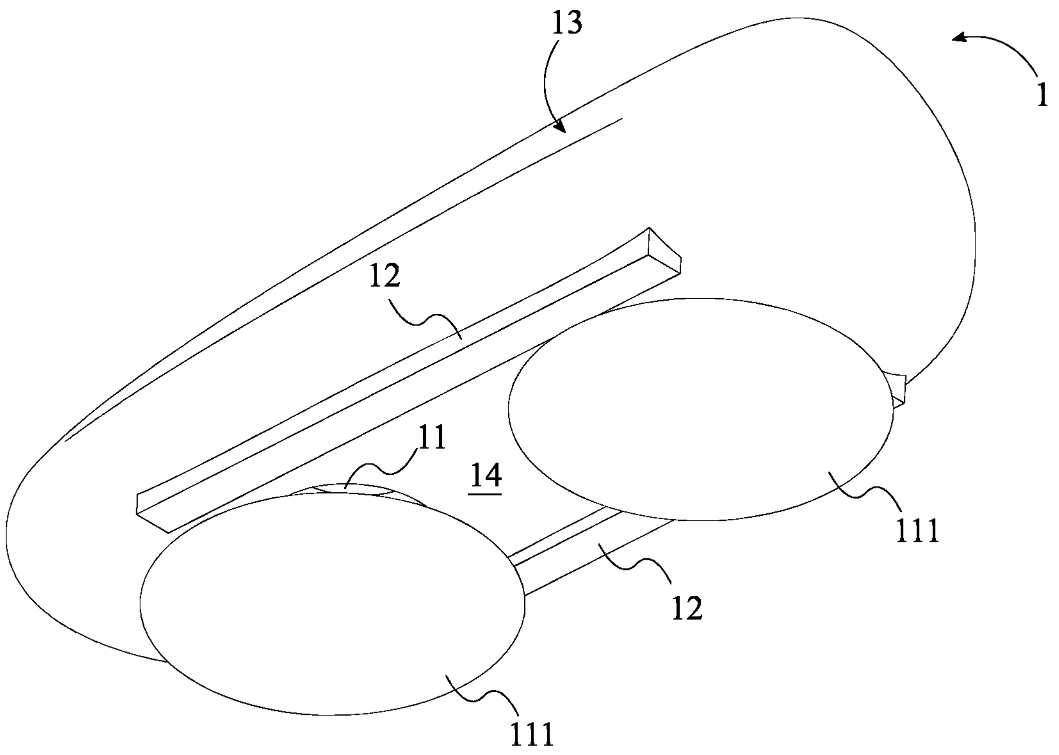
FIG. 1 is a bottom perspective view of the present invention.

In reference to FIG. 1, the plurality of fastening holes 11 is positioned along the string instrument facing side 14. As a result, the plurality of fastening holes 11 allows the string instrument facing side 14 to attach offset to an external object. The plurality of extruded ridges 12 is positioned along the string instrument facing side 14. Consequently, the plurality of extruded ridges 12 provides a barrier between the string instrument facing side 14 an externally attached object. The plurality of fastening holes 11 is a circular shape. Accordingly, the plurality of fastening holes 11 creates a cylindrically shaped cavity within the wedge body 1.

Figure 3:
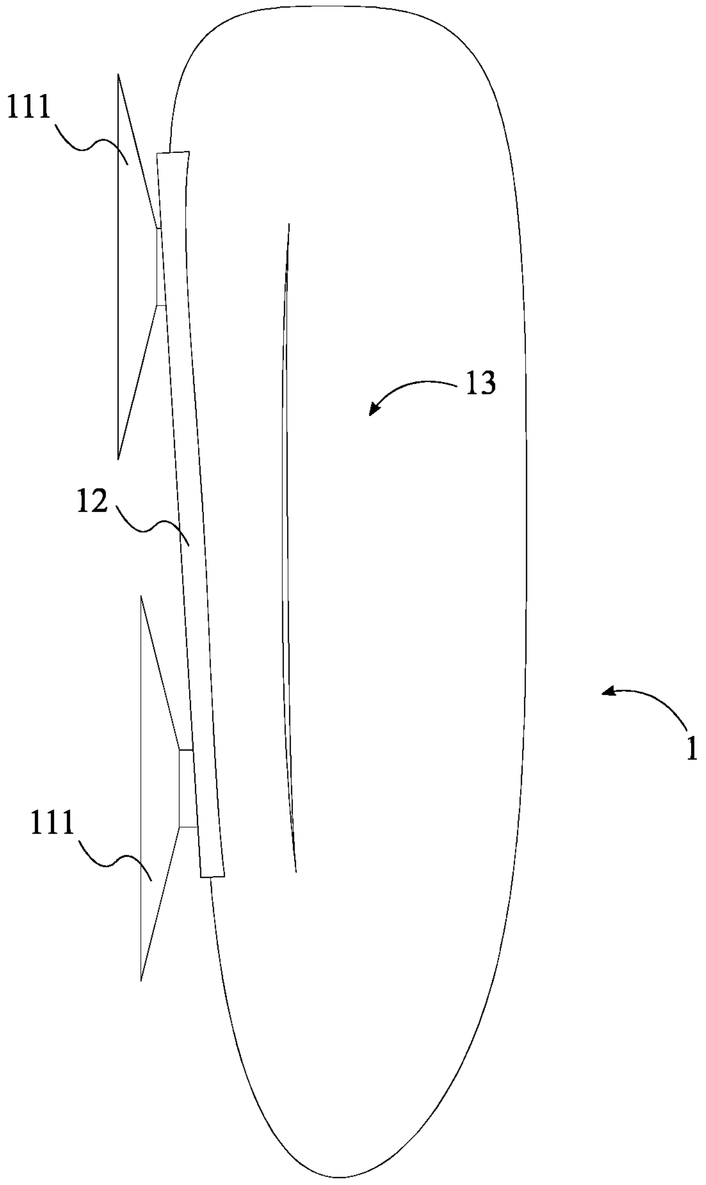
FIG. 3 is a side view of the present invention.
Figure 5:
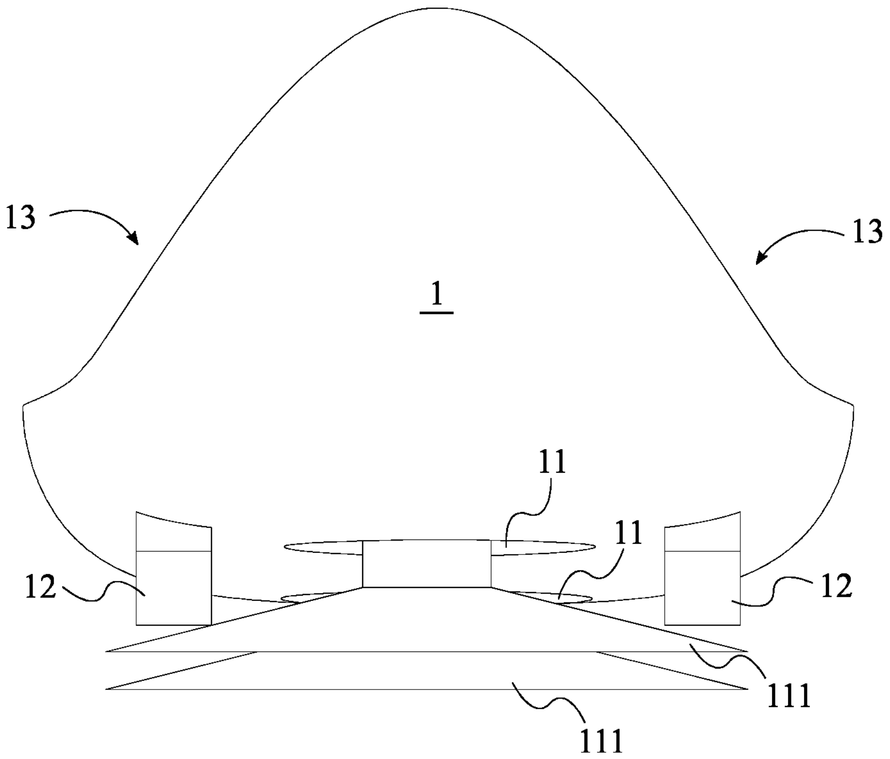
FIG. 5 is a closeup front view of the present invention.

In reference to FIG. 5, the plurality of fastening holes 11 further comprises a suction cup 111. The suction cup 111 is a fastening device that allows the present invention to be easily connected to an external object. The suction cup 111 is positioned within the plurality of fastening holes 11. Thus, the suction cup 111 is slightly recessed within the wedge body 1. The suction cup 111 extends away from the string instrument facing side 14. So, the suction cup 111 protrudes away from the string instrument facing side 14. The suction cup 111 is a conical and cylindrical shape. As a result, the suction cup 111 surface area expands as it exits the plurality of fastening holes 11 as shown in FIG. 3. The suction cup 111 is permanently secured within the plurality of fastening holes 11. Consequently, the suction cup 111 stays within the plurality of fastening holes 11, limiting the directional movement of the suction cup 111, and securing the wedge body 1 to an external object.

Further, the suction cup 111 is a flexible material. This allows the suction cup 111 to bend and slightly change from the original shape of the suction cup 111. The suction cup 111 tilts within the plurality of fastening holes 11. Accordingly, the suction cup 111 allows the wedge body 1 to tilt once secured to an external object via the suction cup 111. The suction cup 111 creates a pressure differential with an external object offset the present invention. Thus, the suction cup 111 stays secured to an external object until the pressure differential is disrupted, as seen in FIG. 4.

Furthermore, the plurality of fastening holes 11 is in line with each fastening hole. So, the plurality of holes is positioned along the lengthwise center line of the string instrument facing side 14 as shown in FIG. 4. The plurality of extruded ridges 12 is positioned on either side of the plurality of fastening holes 11. As a result, the plurality of extruded ridges 12 provides an external boundary around two sides of the plurality of fastening holes 11 on the lengthwise side of the string instrument facing side 14. The plurality of extruded ridges 12 is rectangularly shaped. Consequently, the plurality of extruded ridges 12 provides a uniform shape along the string instrument facing side 14.

In reference to FIG. 1, the plurality of extruded ridges 12 is positioned along the string instrument facing side 14. Accordingly, the plurality of extruded ridges 12 does not interfere with the contoured edges. The plurality of extruded ridges 12 extrudes from the string instrument facing side 14 Thus, the plurality of extruded ridges 12 creates a gap between the string instrument facing side 14 and the externally attached object. The plurality of extruded ridges 12 limits the tilt angle of the suction cup 111. So, the plurality of extruded ridges 12 ensures the wedge body 1 does not tilt too much while attached to an external object.

Figure 2:
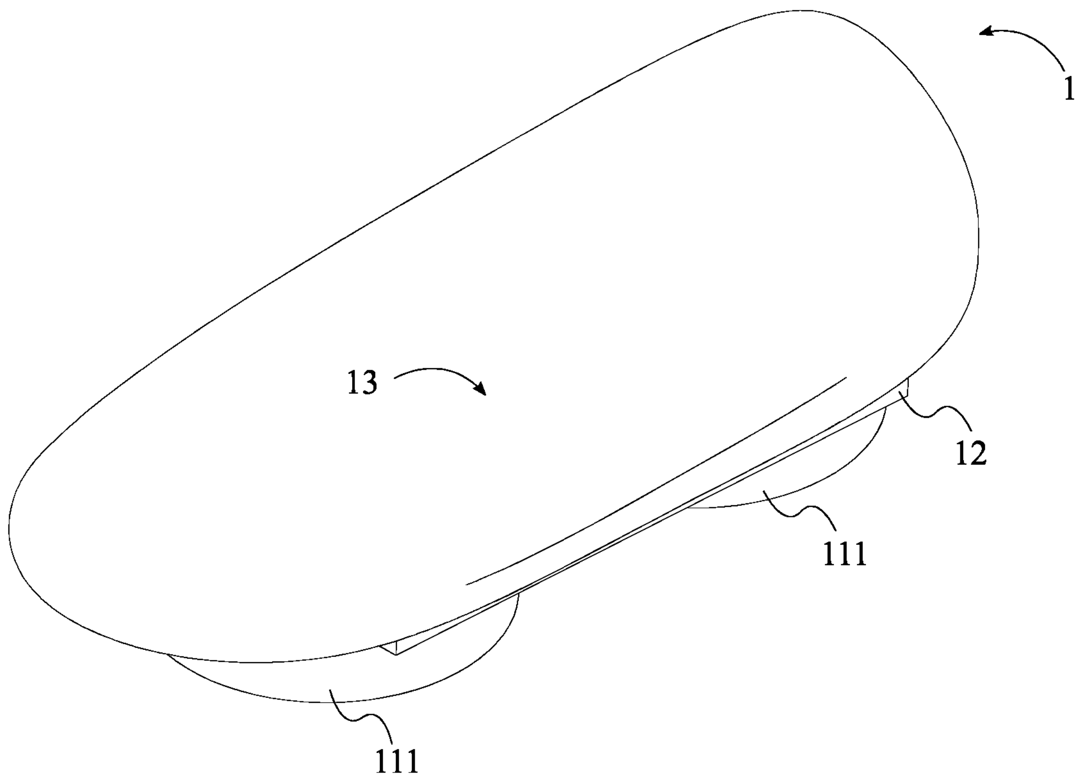
FIG. 2 is a top perspective view of the present invention.

In reference to FIG. 2, the plurality of contoured edges 13 is positioned opposite the string instrument facing side 14. As a result, the plurality of contoured edges 13 is easily accessible while the string instrument facing side 14 is positioned offset an externally attached object. The plurality of contoured edges 13 has a curved convex shape. Thus, the plurality of contoured edges 13 provides a comfortable ergonomic location to rest a thumb or finger.

Although the invention has been explained in relation to its preferred embodiment, it is to be understood that many other possible modifications and variations can be made without departing from the spirit and scope of the invention as hereinafter claimed.

What is claimed is:

1. A removable string instrument thumb rest comprising:

a wedge body; and the wedge body comprising a plurality of fastening holes, a plurality of extruded ridges, a plurality of contoured edges, and a string instrument facing side;
the plurality of fastening holes being positioned along the string instrument facing side;
the plurality of extruded ridges being positioned along the string instrument facing side;
the plurality of fastening holes being a circular shape;
the plurality of fastening holes further comprising a suction cup wherein said suction cup is a conical and cylindrical shape; and
the plurality of extruded ridges being positioned on either side of the plurality of fastening holes closely adjacent to the conical portion of the suction cup whereby the plurality of extended ridges make contact with the conical portion of the suction cup when an object applies force to the thumb rest, thus limiting the tilt angle of the suction cup towards the plurality of extended ridges.

2. The removable string instrument thumb rest as claimed in claim 1 wherein:
the suction cup being positioned within the plurality of fastening holes;
the suction cup extending away from the string instrument facing side;
and
the suction cup being permanently secured within the plurality of fastening holes.

3. The removable string instrument thumb rest as claimed in claim 2 comprising:
the suction cup being a flexible material;
the suction cup tilting within the plurality of fastening holes; and
the suction cup creating a pressure differential with an external object offset the present invention.

4. The removable string instrument thumb rest as claimed in claim 1 comprising:
the plurality of fastening holes being in line with each fastening hole;
and
the plurality of extruded ridges being rectangularly shaped.

5. The removable string instrument thumb rest as claimed in claim 1 comprising:
the plurality of extruded ridges being positioned along the string instrument facing side; and
the plurality of extruded ridges extruding from the string instrument facing side.

6. The removable string instrument thumb rest as claimed in claim 1 comprising:
the plurality of contoured edges being positioned opposite the string instrument facing side; and
the plurality of contoured edges having a curved convex shape.

7. A removable string instrument thumb rest comprising:
a wedge body;
the wedge body comprising a plurality of fastening holes, a plurality of extruded ridges, a plurality of contoured edges, and a string instrument facing side;
the plurality of fastening holes being positioned along the string instrument facing side;
the plurality of extruded ridges being positioned along the string instrument facing side;
the plurality of fastening holes being a circular shape;
the plurality of fastening holes further comprising a suction cup wherein said suction cup is a conical and cylindrical shape composed of a flexible material; and
the plurality of extruded ridges being positioned on either side of the plurality of fastening holes closely adjacent to the conical portion of the suction cup whereby the plurality of extended ridges make contact with the conical portion of the suction cup when an object applies force to the thumb rest, thus limiting the tilt angle of the suction cup towards the plurality of extended ridges.

8. The removable string instrument thumb rest as claimed in claim 7 comprising:
the suction cup being positioned within the plurality of fastening holes;
the suction cup extending away from the string instrument facing side;
and
the suction cup being permanently secured within the plurality of fastening holes.

9. The removable string instrument thumb rest as claimed in claim 8 comprising:
the suction cup tilting within the plurality of fastening holes; and
the suction cup creating a pressure differential with an external object offset the present invention.

10. The removable string instrument thumb rest as claimed in claim 7 comprising:
the plurality of fastening holes being in line with each fastening hole;
and
the plurality of extruded ridges being rectangularly shaped.

11. The removable string instrument thumb rest as claimed in claim 7 comprising:
the plurality of extruded ridges being positioned along the string instrument facing side; and
the plurality of extruded ridges extruding from the string instrument facing side.

12. The removable string instrument thumb rest as claimed in claim 7 comprising:
the plurality of contoured edges being positioned opposite the string instrument facing side; and
the plurality of contoured edges having a curved convex shape.

13. A removable string instrument thumb rest comprising:
a wedge body;
the wedge body comprising a plurality of fastening holes, a plurality of extruded ridges, a plurality of contoured edges, and a string instrument facing side;
the plurality of fastening holes being positioned along the string instrument facing side;
the plurality of extruded ridges being positioned along the string instrument facing side;
the plurality of fastening holes being a circular shape;
the plurality of fastening holes being in line with each fastening hole;
the plurality of extruded ridges being positioned on either side of the plurality of fastening holes;
the plurality of extruded ridges being rectangularly shaped;
the plurality of extruded ridges being positioned along the string instrument facing side;
the plurality of extruded ridges extruding from the string instrument facing side;
the plurality of fastening holes further comprising a suction cup wherein said suction cup is a conical and cylindrical shape; and
the plurality of extruded ridges being positioned on either side of the plurality of fastening holes closely adjacent to the conical portion of the suction cup whereby the plurality of extended ridges make contact with the conical portion of the suction cup when an object applies force to the thumb rest, thus limiting the tilt angle of the suction cup towards the plurality of extended ridges.

14. The removable string instrument thumb rest as claimed in claim 13 comprising:

the suction cup being positioned within the plurality of fastening holes;

the suction cup extending away from the string instrument facing side;

and the suction cup being permanently secured within the plurality of fastening holes.

15. The removable string instrument thumb rest as claimed in claim 14 comprising:

the suction cup being a flexible material;

the suction cup tilting within the plurality of fastening holes; and the suction cup creating a pressure differential with an external object offset the present invention.

16. The removable string instrument thumb rest as claimed in claim 13 comprising:

the plurality of contoured edges being positioned opposite the string instrument facing side; and the plurality of contoured edges having a curved convex shape.

* * * * *